United States Patent
Sun

(10) Patent No.: US 6,422,099 B1
(45) Date of Patent: Jul. 23, 2002

(54) TRANSMISSION DEVICE FOR KNIFE CHANGING MECHANISM OF A MACHINE CENTER

(76) Inventor: Ying Sun, No. 20, Alley 28, Lane 851, Chung Shan Road, Shen Kang Hsiang, Taichung Hsien (TW)

( * ) Notice: Subject to any disclaimer, the term of this patent is extended or adjusted under 35 U.S.C. 154(b) by 31 days.

(21) Appl. No.: 09/717,028

(22) Filed: Nov. 22, 2000

(51) Int. Cl.[7] .......................... F16H 25/08; F16H 25/16
(52) U.S. Cl. ............................................. 74/55; 74/567
(58) Field of Search ................................ 74/55, 56, 57, 74/53, 54, 422, 23, 29, 567

(56) References Cited

U.S. PATENT DOCUMENTS 5,337,623 A * 8/1994 Huang et al. ............. 74/813 R
5,752,905 A * 5/1998 Yan et al. ..................... 483/44
6,098,478 A * 8/2000 Sandrock ....................... 74/53

* cited by examiner

Primary Examiner—David Fenstermacher
Assistant Examiner—Justin Stefanon
(74) Attorney, Agent, or Firm—Bacon & Thomas, PLLC

(57) ABSTRACT

A transmission device for knife changing mechanism of a machine center includes a main shaft and a control shaft whose idle gear is engaged with a toothed section of the main shaft and the other idle gear on the control shaft is engaged with a rack which is moved with the rotation of a cam disk. An arm is engaged with the cam disk and pulls the main shaft when the cam disk is rotated by an output shaft from a motor. The control shaft is allowed to shaft toward the main shaft to reduce a gap between the control shaft and the main shaft.

4 Claims, 7 Drawing Sheets

US 6,422,099 B1

TRANSMISSION DEVICE FOR KNIFE CHANGING MECHANISM OF A MACHINE CENTER

FIELD OF THE INVENTION

The present invention relates to a transmission device for knife changing mechanism of a machine center wherein the transmission distance between the cam and the main shaft is shortened and a gap between the control shaft can be adjusted.

BACKGROUND OF THE INVENTION

A conventional transmission device 60 for knife changing mechanism of a machine center is shown in FIG. 7 and generally includes a motor which drives a belt 62 with its output shaft 61 and a gear shaft 63 is rotated by the belt 62. A worm gear 631 is connected to the gear shaft 63 and engaged with a worm gear disk 641 on a cam 64. An arm 65 is pivotally connected to the cam 64 and clamps a main shaft 66 so that when the cam 64 is rotated, the main shaft 66 is moved up and down to activate a knife changing device. A main shortcoming is that the distance from the gear shaft 63 to the cam 64 is so long that a large scale of cam 64 is required which is costly and heavy. An unexpected gap is found between the gear shaft 63 and the cam 64 after being used for a period of time, this gap will result in a huge wear between the gear shaft 63 and the worm gear disk 641. Not only noise is generated but the precision of the knife changing is reduced, and this could make knife drop happen. Furthermore, the main shaft 66 is movably mounted to a hexagonal post 67, and the precision between the main shaft 66 and the hexagonal post 67 is obtained by a costly price.

The present invention intends to provide a transmission device for knife changing mechanism wherein the distance between the control shaft and the cam is shortened.

SUMMARY OF THE, INVENTION

In accordance with one aspect of the present invention, there is provided a transmission device for knife changing mechanism of a machine center and comprising a motor connected to a top of a casing and driving an output shaft on which a first bevel gear is connected to the output shaft and engaged with a second bevel gear mounted to a cam shaft on which a cam disk is mounted. A first groove is defined in a first side of the cam disk and a second groove is defined in a second side of the cam disk. A rack has a first pin movably engaged with the first groove and an arm having a first end pivotally connected to the casing and a pin extends from the arm and movably engaged with the second groove. A main shaft movably extends through the top of the casing and has a toothed section and an annular groove is defined in an outer periphery of the main shaft. A second end of the arm is engaged with the annular groove. A tube is connected to the top of the casing and the main shaft is movably inserted in the tube. A first detection device and a second detection device are respectively and radially connected to the tube. A control shaft extends through an aperture defined through the top of the casing and is fixedly connected to a cap on the top of the casing. A first idle gear and a second idle gear are respectively mounted to the control shaft. The first idle gear is engaged with the rack and the second idle gear is engaged with the toothed section on the main shaft.

The primary object of the present invention is to provide a transmission device for knife changing mechanism and the device has a compact size and the distance between the control shaft and the cam is shortened.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
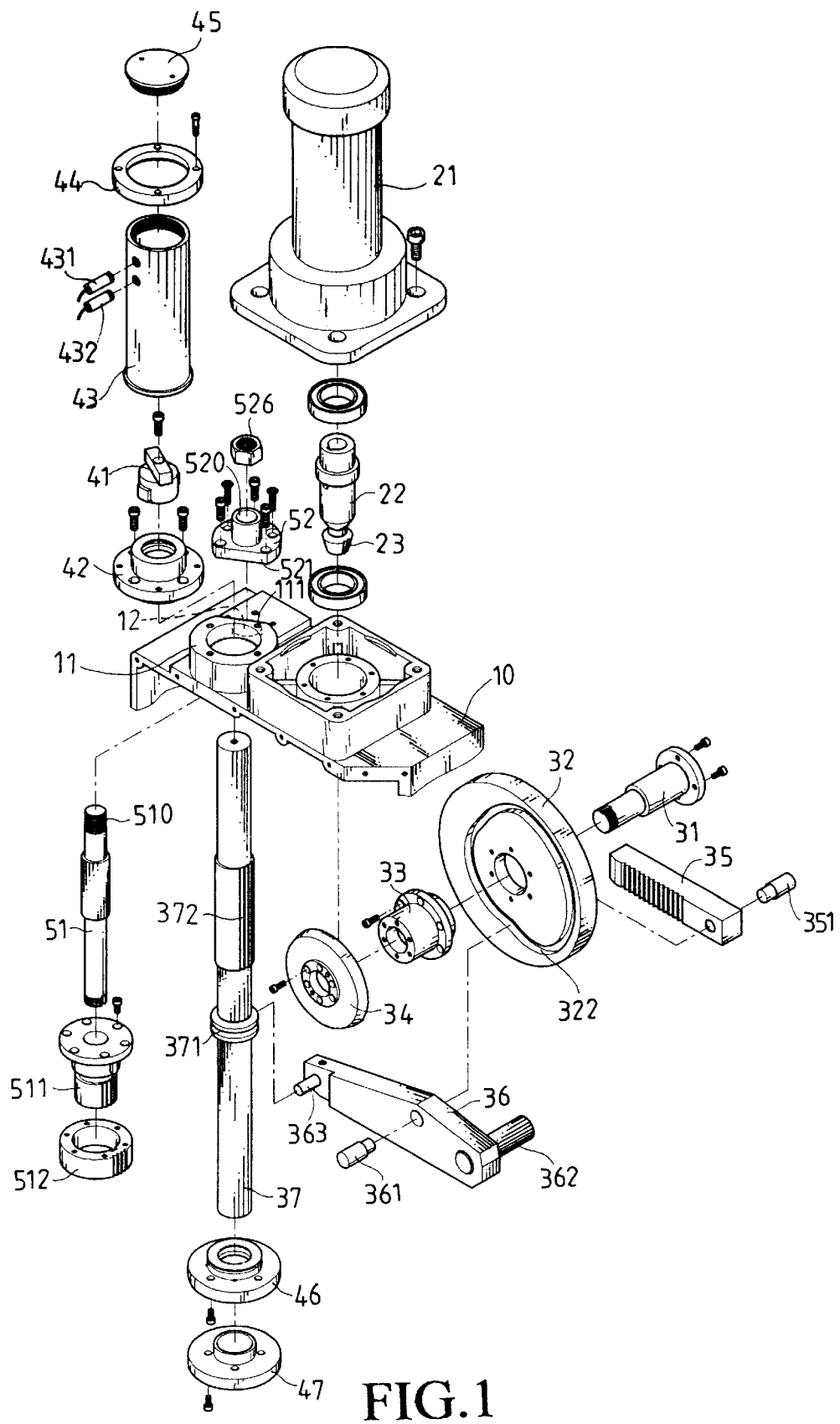
FIG. 1 is an exploded view to show a transmission device for knife changing mechanism of the present invention.
Figure 2:
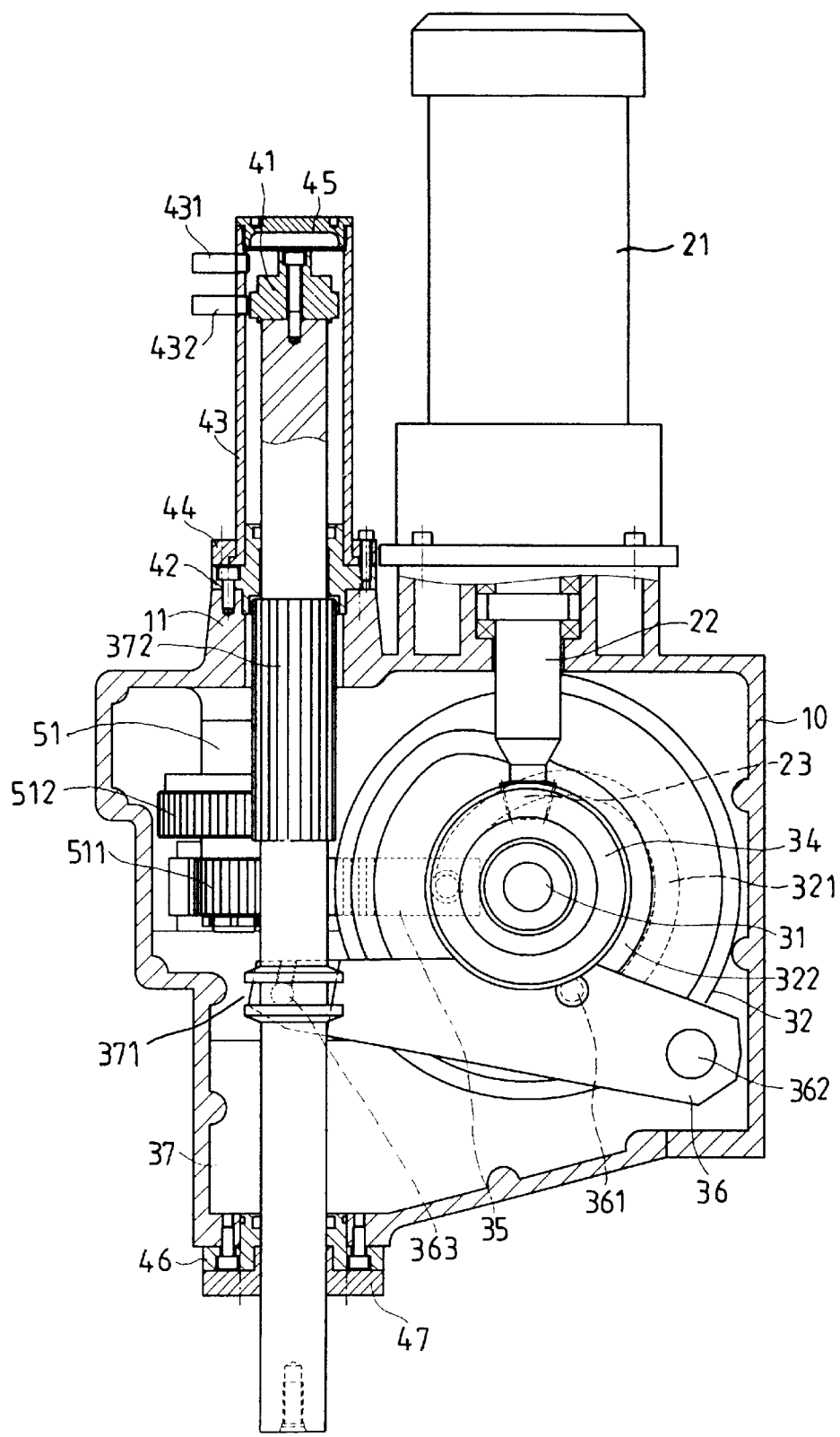
FIG. 2 is a side cross sectional view to show the transmission device for knife changing mechanism of the present invention.
Figure 3:
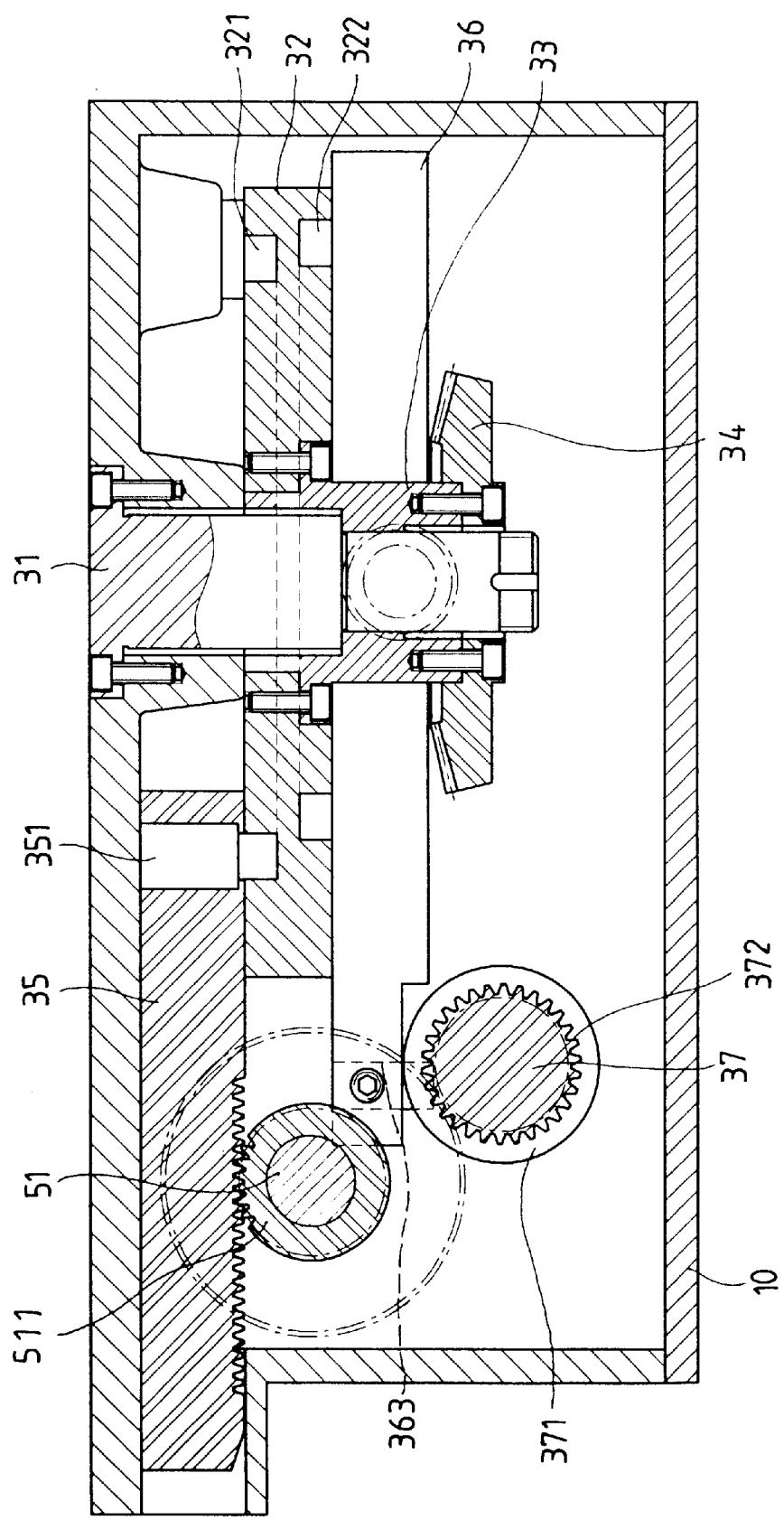
FIG. 3 is a top cross sectional view to show the transmission device for knife changing mechanism of the present invention.
Figure 4:
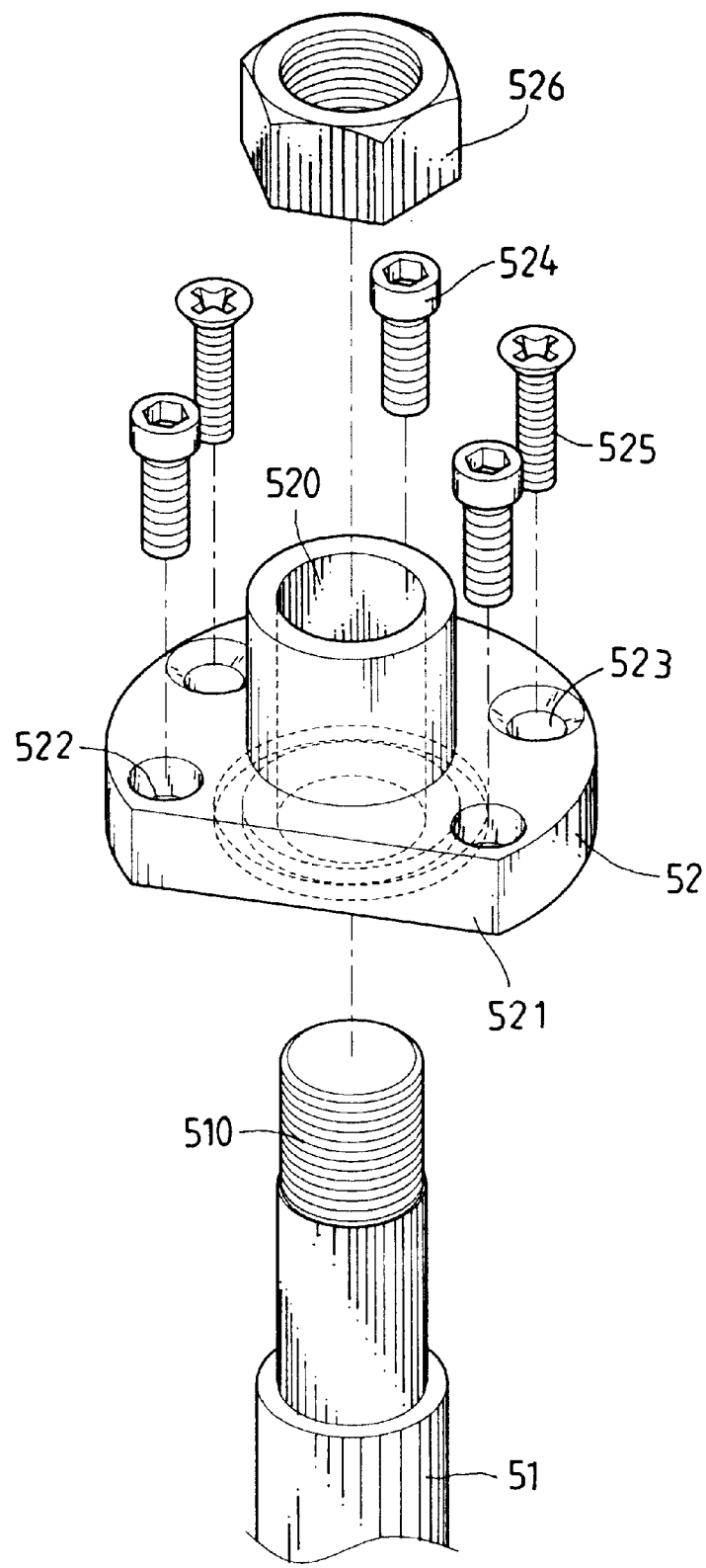
FIG. 4 is an exploded view to show a cap and a control shaft of the transmission device of the present invention.

Referring to FIGS. 1 to 3, the transmission device of the present invention for knife changing mechanism of a machine center comprises a motor 21 connected to a top of a casing 10 and the motor 21 drives an output shaft 22 on which a first bevel gear 23 is connected. A cam disk 32 is mounted to a cam shaft 31 in the casing 10 and a socket 33 is mounted to the cam shaft 31 and a second bevel gear 34 is mounted to the socket 33. The second bevel gear 34 is engaged with the first bevel gear 23. A first groove 321 (FIG. 2) is defined in a first side of the cam disk 32 and a second groove 322 is defined in a second side of the cam disk 32. A rack 35 has a first pin 351 extending therefrom and movably engaged with the first groove 321. An arm 36 has a shaft 362 extending from a first end thereof and the shaft 362 is pivotally connected to the casing 10. A second pin 361 extends from the arm 36 and is movably engaged with the second groove 322.

A main shaft 37 is movably extending through an annular lip 11 on the top of the casing 10 and has a toothed section 372 and an annular groove 371 defined in an outer periphery of the main shaft 37. A second end of the arm 36 has a pin 363 which is engaged with the annular groove 371. A lower cap 46 and a retaining collar 47 are respectively connected to an underside of the casing 10 and the lower end of the main shaft 37 movably extends through the lower cap 46 and the retaining collar 47. A fixing collar 42 is connected to the annular lip 11 and a tube 43 is connected to the annular lip 11 by the fixing collar 42 and a pressing ring 44. The main shaft 37 is movably inserted in the tube 43 and a block 41 is connected to a top of the main shaft 37 in the tube 43. A top cap 45 closes a top of the tube 43. A first detection device 431 and a second detection device 432 are respectively and radially connected to the tube 43 so that when the main shaft 37 is moved in the tube 43, one of the first detection device 431 and the second detection device 432 is covered or activated by the block 41 to let the motor 21 to rotate in reverse.

Figure 6A:
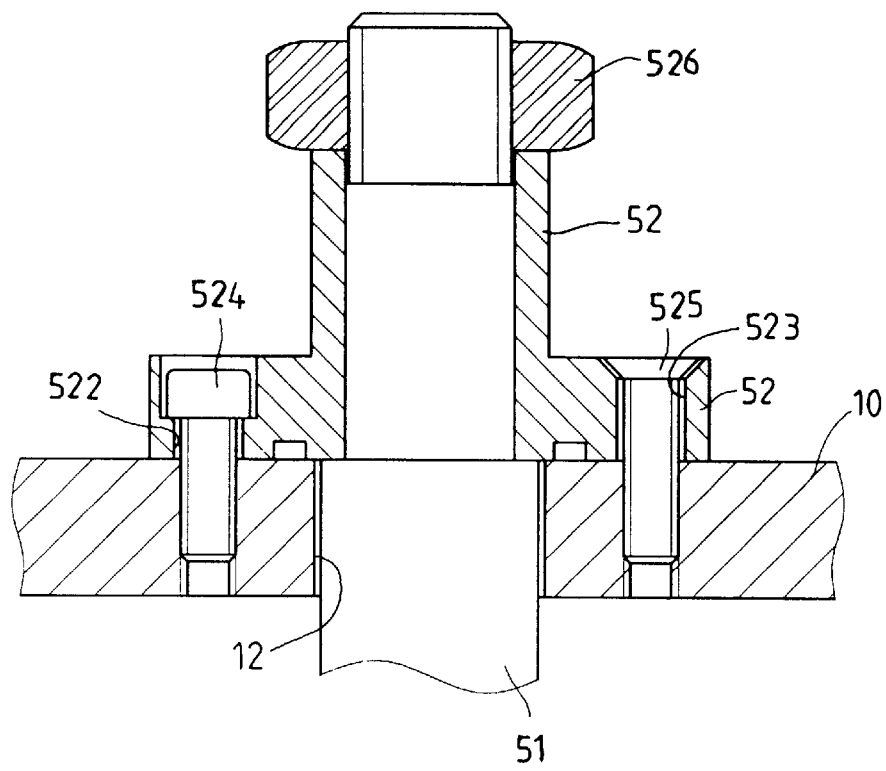
FIG. 6A shows the control shaft is connected to the cap wherein the control shaft is not shifted.
Figure 6B:
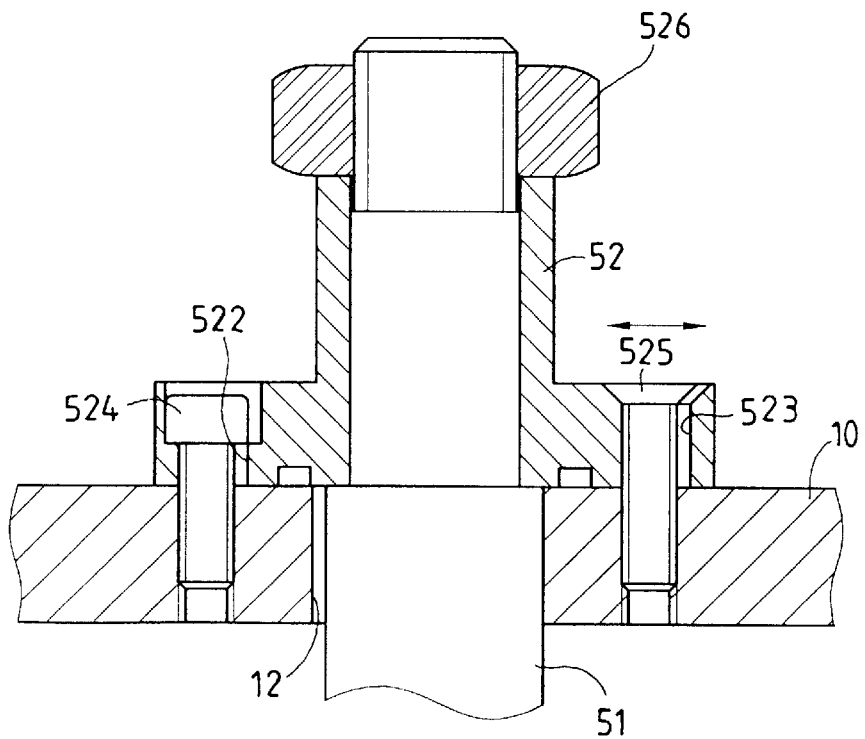
FIG. 6B shows the control shaft and the cap are shifted.
Figure 7:
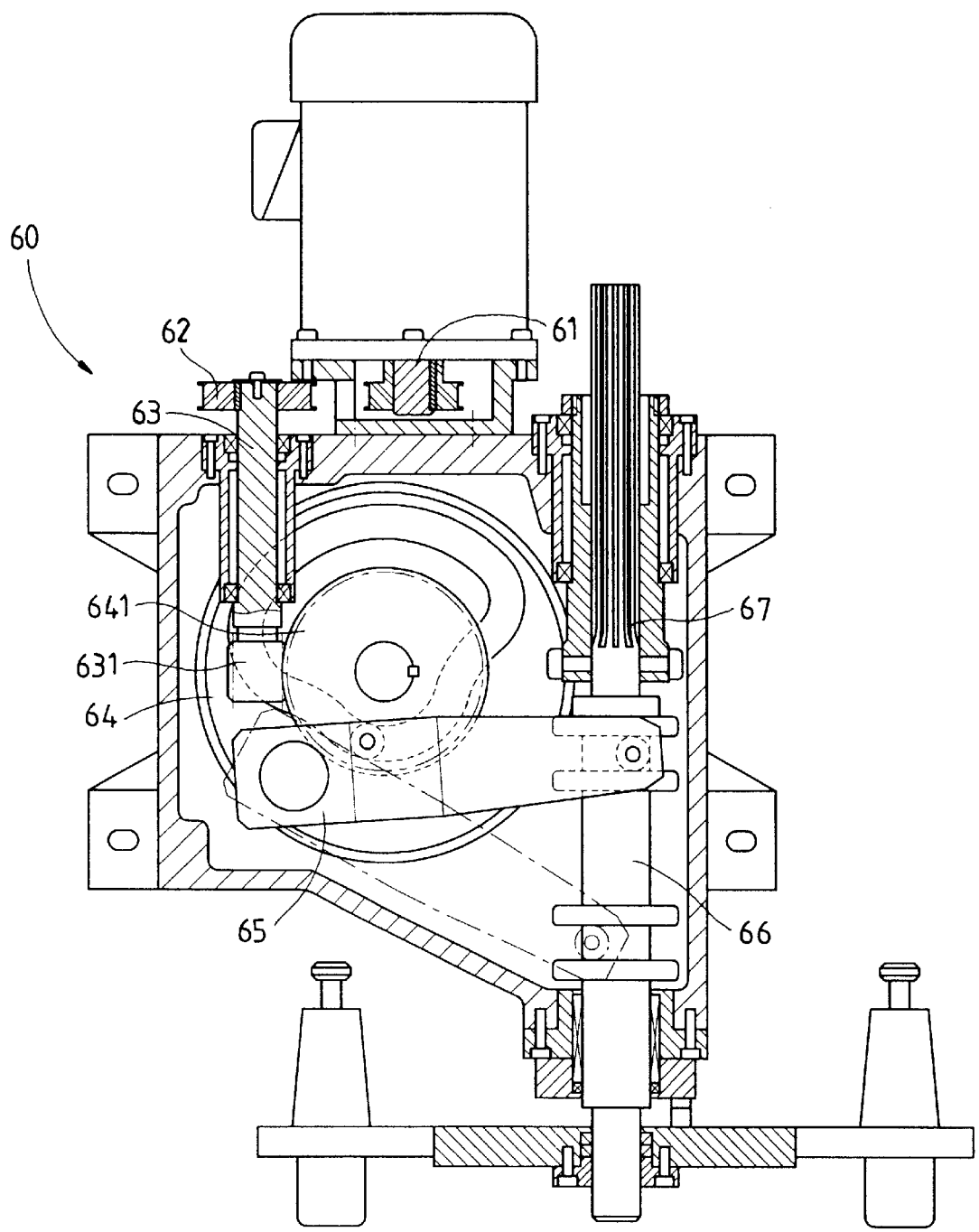
FIG. 7 shows a conventional transmission device for knife changing mechanism of a machine center.

A control shaft 51 extends through an aperture 12 defined through the top of the casing 10 and a cap 52 is connected to a top of the casing 10 and encloses the aperture 12. A passage 520 is defined through the cap 52 and the control shaft 51 has a toothed section 510 which extends through the passage 520 and is engaged with a nut 526. A plurality of holes 522, 523 are defined through the cap 52 and each hole 522/523 receives a bolt 524/525 therein. The bolts 524, 525 are threadedly engaged with the casing 10. The annular lip 11 has a first flat surface 111 defined in an outer periphery thereof and the cap 52 has a second flat surface 521 defined in an outer periphery thereof. The first flat surface 111 and the second flat surface 521 are matched with each other. An inner diameter of each hole 522/523 is larger than an outer diameter of each bolt 524/525, and an inner diameter of the aperture 12 is larger than an outer diameter of the control shaft 51 so that the control shaft 51 and the cap 52 are allowed to be movably shafted within the aperture 12 as shown in FIGS. 6A and 6B by moving along the two flat surfaces 111, 521.

A first idle gear 511 and a second idle gear 512 are respectively mounted to the control shaft 51, wherein the first idle gear 511 is engaged with the rack 35 and the second idle gear 512 is engaged with the toothed section 372 on the main shaft 37.

Figure 5:
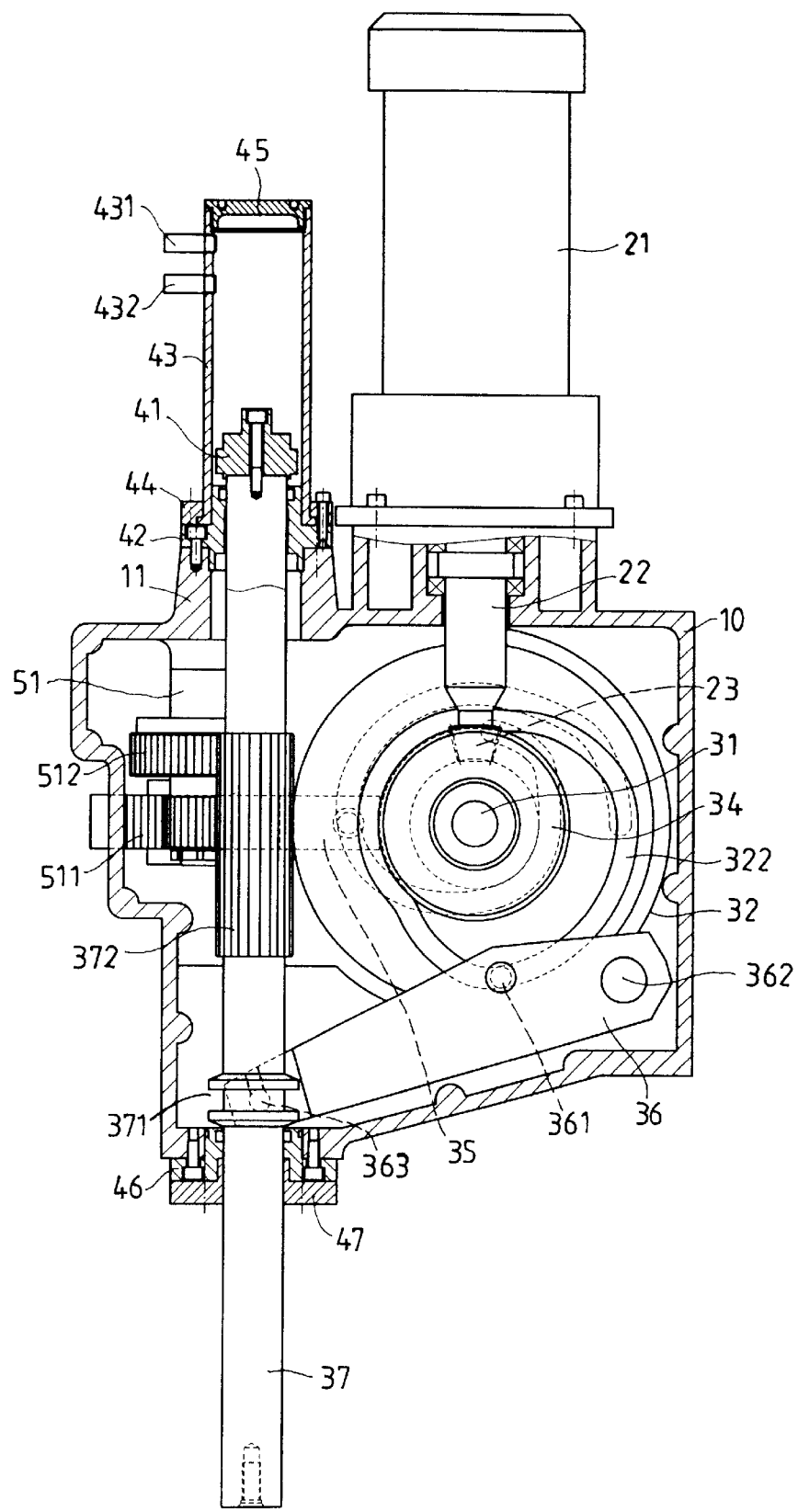
FIG. 5 is a side cross sectional view to show the main shaft is pulled by the arm of the transmission of the present invention.

As shown in FIG. 5, when the motor 21 is operated, the cam disk 32 is rotated and the rack 35 rotates the first idle gear 511. Therefore the second idle gear 512 rotates the main shaft 37 and the arm 36 is pivoted about the shaft 362 to pull the main shaft 37 lower as shown to proceed the knife changing processes. When there is gap defined between the second idle gear 512 and the toothed section 372 of the main shaft 37, as shown in FIGS. 6A and 6B, the bolts 524, 525 are unscrewed and the control shaft 51 is shifted within the aperture 12 and toward the main shaft 37 and the cam disk 32. The cap 52 is also shifted because the control shaft 51 is fixed with the cap 52. The transmission device of the present invention has a compact size and the distance between the control shaft 51 and the cam 32 and the main shaft 37 is shortened and adjustable.

While we have shown and described various embodiments in accordance with the present invention, it should be clear to those skilled in the art that further embodiments may be made without departing from the scope and spirit of the present invention.

What is claimed is:

1. A transmission device for knife changing mechanism of a machine center, comprising:

a motor connected to a top of a casing and driving an output shaft, a first bevel gear connected to said output shaft;

a cam disk mounted to a cam shaft in said casing and a second bevel gear mounted to said cam shaft and engaged with said first bevel gear, a first groove defined in a first side of said cam disk and a second groove defined in a second side of said cam disk;

a rack having a first pin extending therefrom and movably engaged with said first groove, an arm having a first end thereof pivotally connected to said casing and a second pin extending from said arm and movably engaged with said second groove;

a main shaft movably extending through said top of said casing and having a toothed section and an annular groove defined in an outer periphery of said main shaft, a second end of said arm engaged with said annular groove, a tube connected to said top of said casing and said main shaft movably inserted in said tube, a first detection device and a second detection device respectively and radially connected to said tube, and a control shaft extending through an aperture defined through said top of said casing and fixedly connected to a cap on said top of said casing, a first idle gear and a second idle gear respectively mounted to said control shaft, said first idle gear engaged with said rack and said second idle gear engaged with said toothed section on said main shaft.

2. The transmission mechanism as claimed in claim 1 wherein said cap is fixedly connected to said top of said casing and a passage is defined through said cap, said control shaft having a toothed section which extends through said passage in said cap and engaged with a nut.

3. The transmission mechanism as claimed in claim 2 further comprising a plurality of holes defined through said cap, each hole receiving a bolt therein and said bolts threadedly engaged with said casing, an inner diameter of each hole being larger than an outer diameter of each bolt, an inner diameter of said aperture being larger than an outer diameter of said control shaft so that said control shaft is movably shafted within said aperture.

4. The transmission mechanism as claimed in claim 3 further comprising an annular lip on said top of said casing and said tube connected to said annular lip, said annular lip having a first flat surface defined in an outer periphery thereof and said cap having a second flat surface defined in an outer periphery thereof, said first flat surface and said second flat surface matched with each other.

* * * * *